UNITED STATES PATENT OFFICE.

ALBERT M. BLACKMON, OF SWEET HOME, TEXAS, ASSIGNOR OF TWO-THIRDS TO R. M. BLACKMON, JOHN A. YOUNGKIN, AND JOSIAH S. YOUNGKIN, ALL OF SAME PLACE.

ARTIFICIAL-STONE COMPOSITION.

SPECIFICATION forming part of Letters Patent No. 420,326, dated January 28, 1890.

Application filed September 11, 1889. Serial No. 323,667. (No specimens.)

*To all whom it may concern:*

Be it known that I, ALBERT M. BLACKMON, a citizen of the United States, residing at Sweet Home, in the county of Lavaca and State of Texas, have invented certain new and useful Improvements in Artificial-Stone Compositions; and I do hereby declare that the following is a full, clear, and exact description of the invention, which will enable others skilled in the art to which it appertains to make and use the same.

This invention relates to an artificial-stone composition; and it has for its object to produce an artificial stone adapted for all purposes to which natural stone can be applied, and which can be given any desired shape while in a plastic state, or carved and polished after hardening.

The composition consists of the following ingredients combined in about the following proportions: salt, four ounces; sand, nine pounds; alum, three ounces; Portland cement, seventeen pounds; plaster-of-paris, two pounds; chloride of zinc, one ounce; linseed-oil, (boiled,) one ounce.

In the manufacture of the composition the salt and alum are dissolved together in boiling water, the sand, plaster-of-paris, and cement mixed together dry, and to all of the above is added sufficient water to form a paste. The zinc is dissolved in a pint of cool water and the oil then added, when this mixture is added to the paste, and the whole thoroughly agitated. The composition thus formed is immediately placed in molds and allowed to remain for from four to six hours to harden.

By the employment of the oil the composition when hardened is enabled to take a very high polish and also renders it water-proof, while the zinc hastens the hardening process, requiring from about one-third to one-half the time otherwise required.

I claim as my invention—

1. The herein-described artificial-stone composition, consisting of salt, sand, alum, Portland cement, plaster-of-paris, chloride of zinc, and boiled linseed-oil, in approximately the proportions specified.

2. An artificial-stone composition consisting of four ounces of salt, nine pounds of sand, three ounces of alum, seventeen pounds of Portland cement, two pounds of plaster-of-paris, one ounce of chloride of zinc, and one ounce of boiled linseed-oil, all of said ingredients being mixed and combined as set forth.

In testimony whereof I affix my signature in presence of two witnesses.

ALBERT M. BLACKMON.

Witnesses:
R. BYRN,
JAMES H. THOMAS.